United States Patent [19]
Teeple

[11] Patent Number: 5,865,406
[45] Date of Patent: Feb. 2, 1999

[54] LOW LEVEL TRIPOD CONFIGURATION

[76] Inventor: Garry L. Teeple, 1313 Golf Blvd., Columbia, Mo. 65202

[21] Appl. No.: 857,211

[22] Filed: May 15, 1997

[51] Int. Cl.$^6$ .................................................. F16M 11/00
[52] U.S. Cl. ................................... 248/163.1; 248/187.1; 396/419
[58] Field of Search ............................ 248/163.1, 163.2, 248/167, 168, 177.1, 187.1, 538, 677, 455; 396/419, 428

[56] References Cited

U.S. PATENT DOCUMENTS 4,290,207  9/1981  Browning et al. .................... 248/187.1

*Primary Examiner*—Ramon O. Ramirez
*Assistant Examiner*—Willie Berry, Jr.
*Attorney, Agent, or Firm*—Richard J. Grundstrom

[57] ABSTRACT

The low level tripod configuration of this invention consists of an additional leg being attached to the tripod at or near the head of the tripod. Typically, a tripod holds a camera or any other optical device at specific heights above the ground. Usually the height can be set at anyplace between about 14 inches to about six feet. However, if a close up shot requires the camera to be in a lower position, the tripod can not be set for a lower position. Therefore, in accordance with this invention, an additional leg is added to the top portion of the tripod using various type of attachment methods. In this manner, the tripod can be set on the additional leg and two of the original legs of the tripod in a generally horizontal position. The camera or other optical device can be placed at any position from ground level to the height allowed by the tripod by using the configuration of this invention. The additional leg can be attached and locked in a range of positions. One embodiment has the additional leg stored within one of the three original tripod legs. The additional leg is simply removed and inserted through a hole on the upper portion of the tripod using various configurations and locked into a set position by a locking bolt. A leg spread bracket is also provided for applications that require additional support when the tripod is used in a horizontal position. This may be necessary for added stability when in a horizontal position.

13 Claims, 8 Drawing Sheets

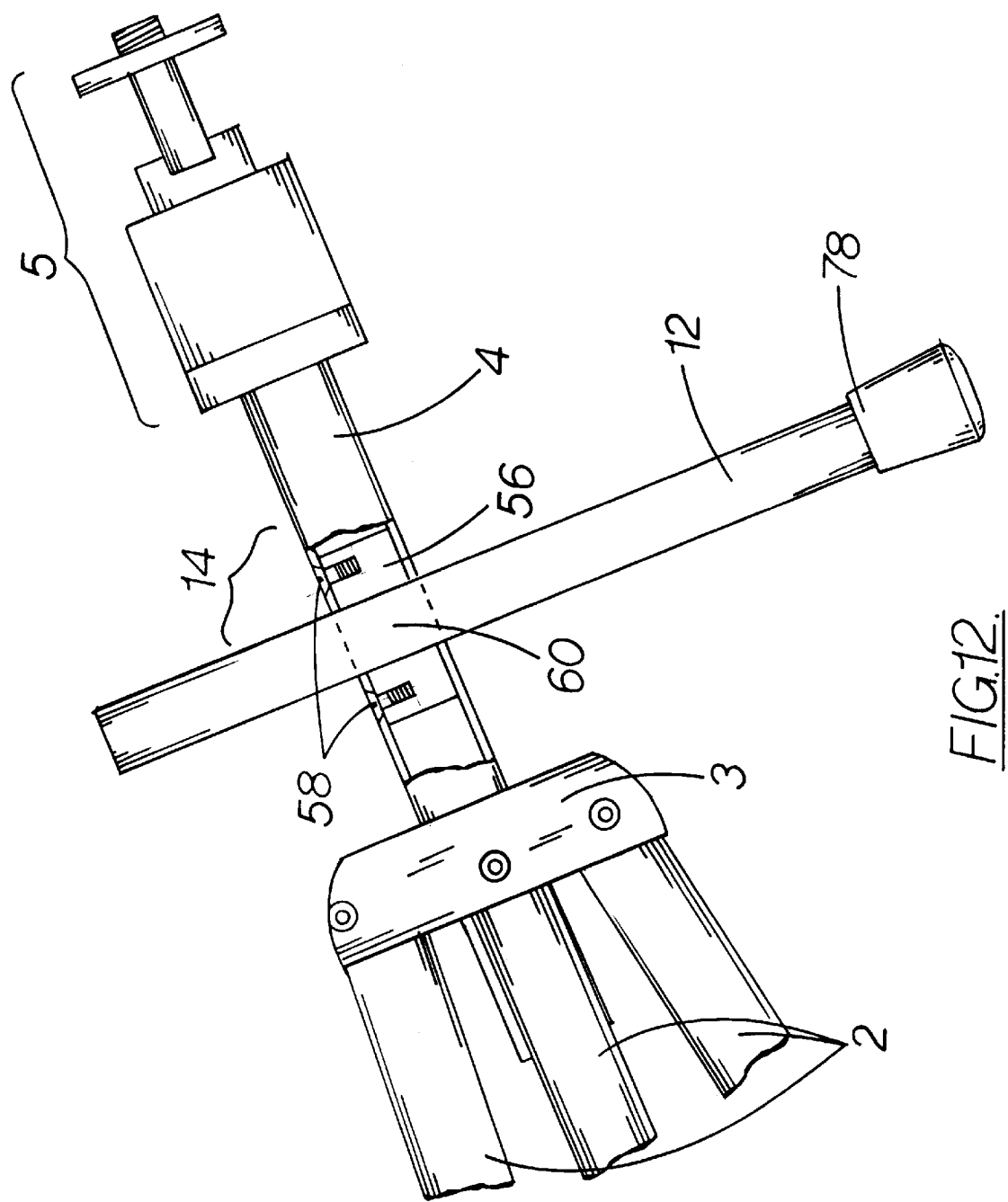

LOW LEVEL TRIPOD CONFIGURATION

BACKGROUND OF THE INVENTION

The present invention relates to a low level tripod configuration and more particularly to a type of tripod configuration that allows positioning of a camera or other optical device at a low level for close up viewing or photography of low lying objects.

Tripods of various designs are well know in the field of photography and are also know and used in other applications using various other optical devices. Tripods are used for telescopes and microscopes for viewing distant and near objects, respectfully. Tripods are also used in construction with levels and transits. All of these applications at times may require the optical device to be set at a very low level. However, the typical tripod only allows a lower height of about fourteen inches at the best. Some tripods the minimum height may even be greater.

A need exists for a stable positioning of an optical device at levels at or near the ground. Close up photography of objects setting on the ground is the most prevalent example. An object setting on the ground can not have a close up photograph unless the camera is setting very near the object. A typical tripod does not allow the camera within about fourteen inches of the object. Therefore, the configuration of this invention allows a tripod to position a camera, or other optical device, at or near ground level.

Other applications may also require the low level position afforded by this invention. Take for example a microscope used to observe small objects in nature that are on the ground. The configuration of this invention would allow the microscope to be placed near the object for better viewing. During construction a level or transit could also be positioned at low levels to overcome obstructions in the line of sight or could be used in places where height of the typical tripod could not be used, such as in a crawl space or under some structure. The configuration of this invention overcomes these problems.

There have been other attempts at solving these problems such as a low tripod by itself, tripods with flexible legs, and tripods with attachments that connect to the lower portion of the tripod legs. All of these work to one extent or the other. However, they all require additional equipment to be carried, are inconvenient, bulky or not very user friendly and may not be very easily attached or detached. This invention overcomes these objection.

Accordingly, it is an object of the present invention to provide an low level tripod configuration that is adapted to provide the capability of positioning an optical device at level at or near the ground. With the low level tripod configuration of this invention it has been found that an optical device can be placed at any position from a low near ground level to the highest position allowed by the tripod. This invention provides the lower range of positioning not previously available with a standard or typical tripod.

Another object of the present invention is to provide an improved low level tripod configuration that is adaptable to virtually any tripod now or later known in the art, and to provide the tripod with the low level positioning made available by this invention.

A further object of the present invention is to provide an low level tripod configuration that is adaptable to many different tripods by different means to satisfy the consumers and their desired to minimize cost and inconvenience. These various means substantially increases the availability and acceptability of this invention.

Still another object of the present invention is to provide a low level tripod configuration in which the cost of implementing the configuration is modest in light of the benefits achieved. Any photographer that takes low level close up photographs may have equipment and supplies worth a small fortune. The cost of the various embodiments contained herein are very modest compared to the cost of other equipment. By having the various embodiments, there is a configuration that will be within the budget of even the most cost conscience photographer.

SUMMARY OF THE INVENTION

To accomplish the foregoing and other objects of this invention there is provided a low level tripod configuration and more particularly to a low level tripod configuration that consists of an additional or fourth leg attached perpendicularly to the top portion of a tripod, so that the tripod can be supported in a horizontal position.

The low level tripod configuration of this invention includes an additional leg attached to the tripod at or near the head of the tripod. The additional leg can be attached to the collar, column or head of a typical tripod. Typically, a tripod holds a camera or other optical device, at specific heights above the ground. The height can be set at anyplace between about 14 inches to about six feet. However, if a close up shot requires the camera to be in a lower position, the tripod can not be set for a lower position. Therefore, the additional leg, of this invention, is simply added to the head, or near the head, of the tripod when needed. In this manner, the tripod can be set on the additional leg and two of the original legs of the tripod. The camera will be placed very near or at the ground level using this configuration.

The additional leg can be attached and locked in a set position. The additional leg is simply inserted through a hole in an attachment means and locked into a set position by a locking bolt. In another embodiment, an adapter or bracket is used to attach the additional leg to the column of the tripod. In this embodiment, the bracket is positioned on the column and the additional leg in inserted through a hole in the adapter. The additional leg can be stored within one of the three original legs of the tripod.

A leg spread bracket may be inserted between the three legs of the tripod for added stability. This may be necessary to support the legs when in a horizontal position. The leg spread bracket is installed on the portion of the column located between the legs and under the collar joining the legs. The leg spread bracket has tabs or arms located adjacent to the leg positions. When in use the leg spread bracket is rotated so the arms will be inline with the legs. The legs are folded onto the arms. When not in use the leg spread bracket can be rotated so the arms fit between the folded legs.

These and other objects and features of the present invention will be better understood and appreciated from the following detailed description of the embodiments thereof, selected for purposes of illustration and shown in the accompanying drawings.

BRIEF DESCRIPTION OF THE DRAWINGS

FIG. 12 is a view showing the low level tripod configuration using the insert as the attachment means.

DETAILED DESCRIPTION

Figure 1:
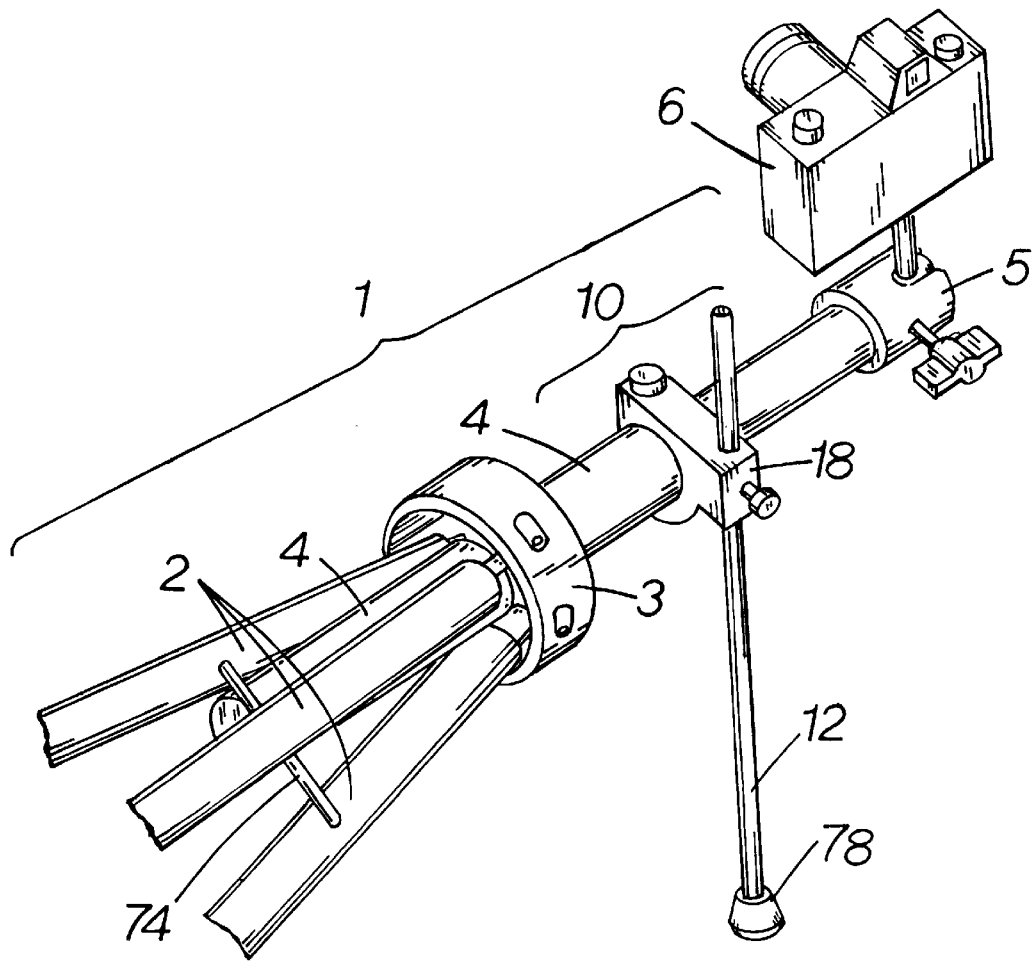
FIG. 1 is a perspective view of one embodiment of the low level tripod configuration of this invention using a leg attachment bracket as the attachment means.

Referring now to the drawings in general there is shown the preferred embodiments for the low level tripod configuration of this invention. The configuration of this invention consists of an additional leg being attached to a tripod at or near the head of the tripod using one of several attachment means. Typically, a tripod holds a camera at specific heights above the ground. The height can be set at anyplace between about 14 inches to about six feet. However, if a close up shot requires the camera to be in a lower position, the tripod can not be set for a lower position. Therefore, the additional leg is added to the head, or near the head of the tripod. In this manner, the tripod can be set in a generally horizontal position supported by the additional leg and two of the original legs of the tripod. The camera can be placed very near the ground using this configuration.

The preferred embodiment and the best mode contemplated of the low level tripod configuration 10 of the present invention are herein described. However, it should be understood that the best mode for carrying out the invention hereinafter described is offered by way of illustration and not by the way of limitation. It is intended that the scope of the invention include all configurations, modifications and alterations which incorporate its principal design features.

The low level tripod configuration 10 of this invention uses a typical tripod 1 known in the industry and in the art. The low level tripod configuration 10 of this invention allows the tripod 1 to be positioned to take low level close up photography or viewing that could not be taken without the configuration. The configuration of this invention can be used on existing tripods 1 or it can be incorporated into a tripod 1 during manufacture. It is a very versatile modification that can be applied to virtually all tripods 1. The tripods 1 for which this low level tripod configuration 10 has been designed is typically used with optical devices such as a camera for taking still pictures or a video camera for taking moving and live pictures. Any optical device that needs low level positioning can also utilize this configuration including transits, levels, microscopes, telescopes and others.

The low level tripod configuration 10 uses a tripod 1 generally described as having a plurality of legs 2 pivotally attached to a collar 3. The legs 2 can be telescopic or fixed. A column 4 is typically adjustably supported by a center opening through the collar 2. Some type of locking means is used to lock the column 2 in a given position within the collar 3. This is typically a type of rack and pinion gear arrangement. As the pinion is rotated, the rack attached to the column 4 moves the column 4 in either an upward or downward motion. This usually provides height adjustment for the optical device 6 attached to the head 5. A head 5 for holding an optical device 6 is typically attached to the top of the column 4. The head 5 can be any of the many types known and available within the field. Some heads 5 are relatively fixed in that the optical device 6 is not allowed a great deal of angle adjustment. Others allow the optical device 6 to be angled, swiveled, or rotated to about any position. These later types of heads 5 will generally perform much better because of the wide range of positioning possible. The optical device 6 can be a still camera, video camera, digital camera, telescope or any other device that the user desired to position at a low level.

The configuration of this invention requires an additional leg 12 that is attached to the upper end of the tripod 1. In application, the additional leg 12 could be attached to the column 4, collar 3, or to the head 5 of the tripod 1. The additional leg 12 would extend outward from the top of the tripod in a generally perpendicular relationship. The additional leg 12 would have to be easily installed and removed, in such a manner that the tripod 1 can be used in a standard manner. The additional leg 12 would also have to be adjustable in that it should be locked or secured in any desired position.

Figure 2:
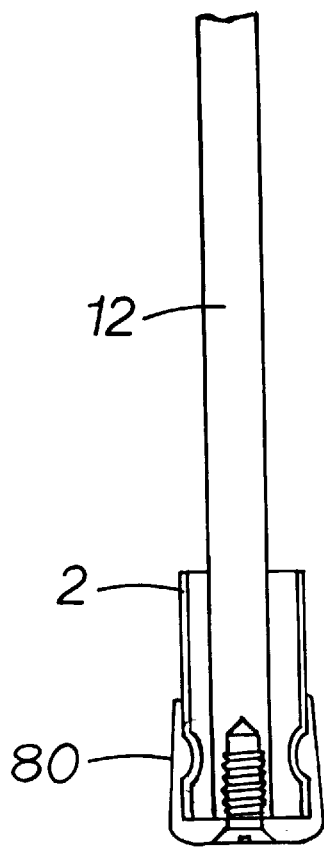
FIG. 2 is a side view of the additional leg.

The additional leg 12 is a short leg consisting of either a solid bar, tube or hollow elongated cylinder. In one embodiment, shown in FIG. 2, the additional leg 12 consists of a short leg that fits within a lower end of one of the plurality of legs 2 on the tripod 1. A boot or rubber foot 78 will typically be included on the lower end of the additional leg 12. The foot 78 provides a non-slip foot and protects the surface on which the tripod is used. In the embodiment that fits within one of the legs 2, a locking cap/foot combination 80 attaches to the lower end of the additional leg 12. The locking cap/foot combination 80 is used to secure the additional leg within the leg 2 of the tripod 1. It also acts as the rubber foot 78 for both the additional leg 12 and the leg 2 of the tripod 1 containing the additional leg 12.

An attachment means 14 is used for attaching the additional leg 12 to the upper portion of the tripod 1. The upper portion consisting of the collar 3, column 4 and head 5. The additional leg 12 and a pair of the plurality of legs 2 act together to support the tripod 1 in a generally horizontal position. This allows the head 5 to be positioned at very low levels and for positioning the optical device 6 at a low level. With the optical device 6 being held upside down on the head 5, the optical device 6 can be placed at or near ground level. Therefore, with this low level tripod configuration 10, the optical device 6 can be positioned anywhere from ground level to the maximum height allowed by the tripod 1.

Figure 4:
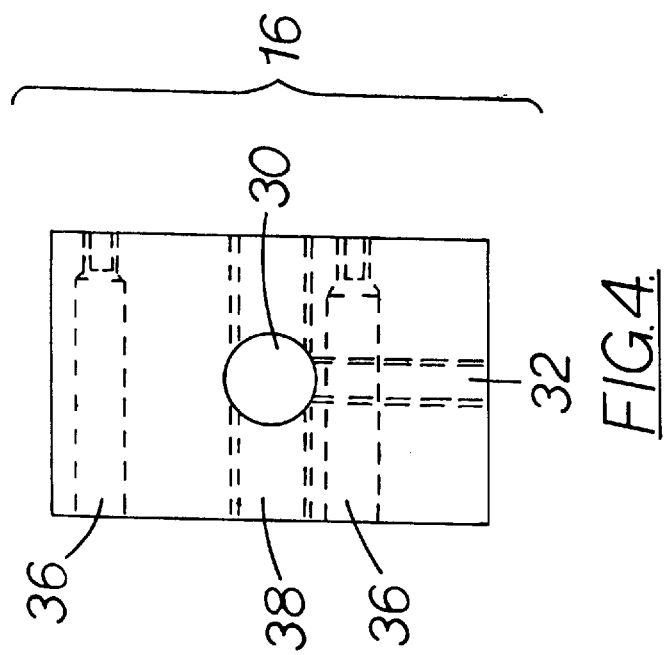
FIG. 4 is a side view of a head block extension.
Figure 3:
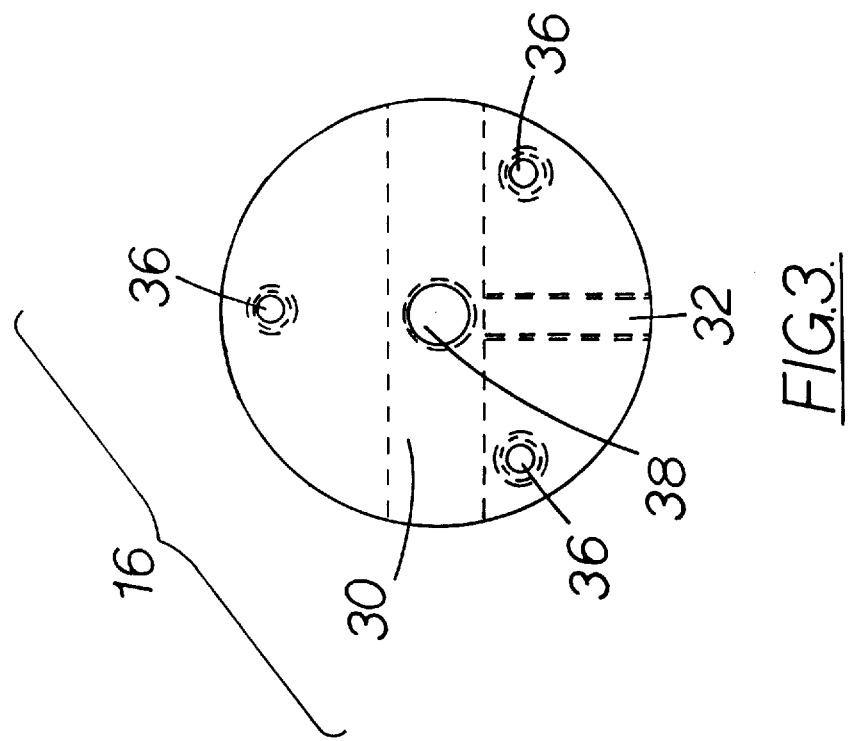
FIG. 3 is a top view of a head block extension.

There are various embodiments of the attachment means 14 depending upon the type and model of tripod 1 being used and the desires of the user. There is a head block extension 16, FIGS. 3 and 4; leg attachment brackets 18, 20 and 22, FIGS. 5, 6 and 7; a tripod clamp 24 and 26, FIGS. 8 and 9; and an insert 28 within column 4, FIGS. 10, 11 and 12. Other variations of the attachment means 14 as herein disclosed herein are also possible without departing from the scope and spirit of the inventive concepts.

A leg spread bracket 74 is also included for holding the legs 2 of the tripod 1 in a spread position during use in a horizontal position.

The head block extension 16 is basically a block. Generally, the block will be cylindrical in shape, but the head 5 and column 4 design will dictate the exact shape and configuration. The head block extension 16 is attached between the top of the column 3 and the head 5. The main features of the block head extension 16 is a lateral bore 30 and a locking bolt 34. The head block extension 16 has a lateral bore 30 through the block for receiving the additional leg 12. A threaded bore 32 also extends laterally through the block perpendicular to the lateral bore 30 for use in locking the additional leg 12 in the head block extension 16. A threaded bolt is screwed into the threaded bore 32 and tightened against the additional leg 12 to secure and hold the additional leg 12 in any given position.

The block head extension 16 may have attaching bolts holes 36 and a center bore 38 for attachment to the column 4 and for attaching the head 5. These will be arranged in accordance with the tripod and head design. They may also be counterbored, threaded or not threaded as dictated by the application. Other modification may also be necessary to fit other tripods.

Figure 5:
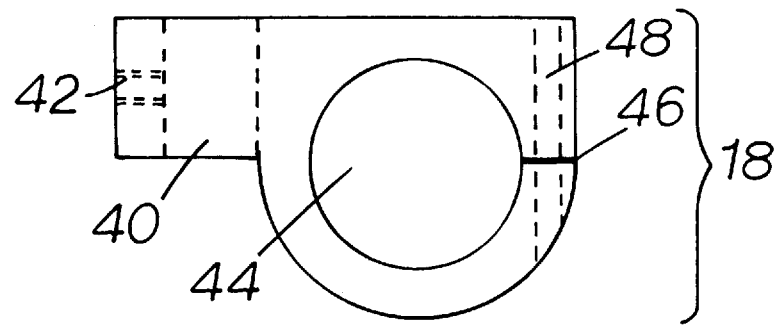
FIG. 5 is a side view of one embodiment of a leg attachment bracket.
Figure 6:
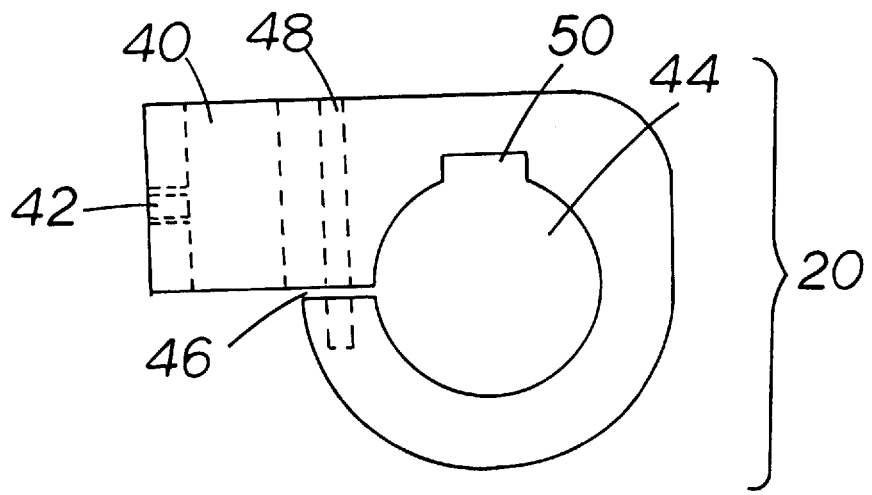
FIG. 6 is a side view of another embodiment of a leg attachment bracket.
Figure 7:
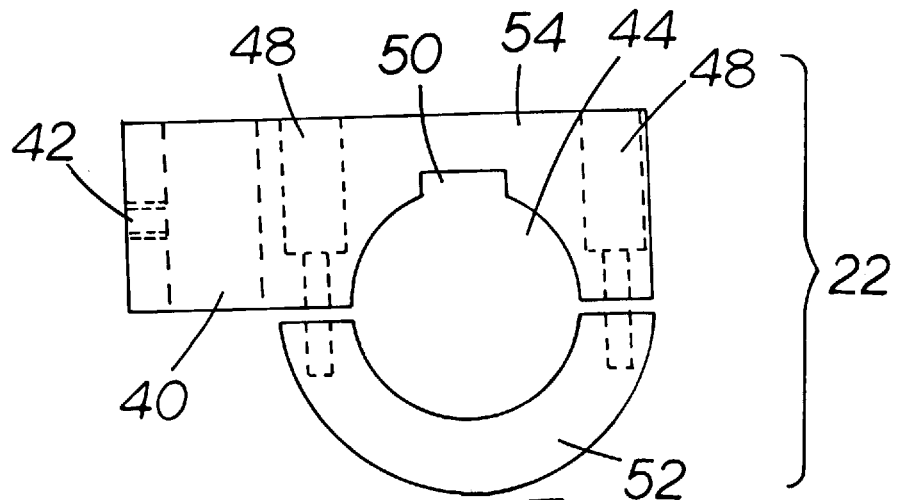
FIG. 7 is a side view of yet another embodiment of a leg attachment bracket.

Another embodiment of the attachment means 14 consists of a leg attachment bracket. Three basic embodiments, referenced as 18, 20 and 22, shown in FIGS. 5, 6 and 7, are illustrated as representative of a leg attachment bracket in accordance with the inventive concepts disclosed herein. Other configurations and modifications not described herein may be needed based upon the exact tripod design. These basic embodiments are for illustration purposes and should fit most tripod designs. However, other modifications may be made as needed and are included within the scope and spirit of the inventive concepts herein disclosed.

The leg attachment brackets 18, 20 or 22 attach to the column 4 and holds the additional leg 12 in a perpendicular relationship to the column 4. The leg attachment bracket 18, 20 and 22 have a lateral bore 40 therethrough to receive and hold the additional leg 14. A locking device, such as a threaded bolt screwed through a threaded bore 42 and tightened against the additional leg 12, secures and locks the additional leg 12 in the lateral bore 40. This feature provides height adjustment for the low level tripod configuration 10.

The various leg attachment brackets 18, 20 and 22 all have an opening 44 for attachment to the column 4. The configuration of the opening 44 constitutes the various differences between these embodiments. In leg attachment bracket 18, FIG. 5, the opening 44 is defined by a circular bore through the body of the bracket. A lateral slit 46 extends through the body to the opening 44. A threaded bore 48 is provided across the slit 46. A bolt screwed into the threaded bore 46 squeezes the slit 46 together and tightens the leg attachment bracket 18 onto column 4.

Leg attachment bracket 20, FIG. 6, is similar except that the slit 46 is located on the opposite side of opening 44. In addition, a groove 50 is included within the opening 44 for clearance of a rack gear used as a height adjustment means on column 4.

Leg spread brackets 18 and 20 are installed on column 4 by removing head 5, slipping the leg attachment bracket 18 or 20 over the top of column 4 and tightening a bolt in the threaded bore 48 to secure the leg attachment bracket at the proper location on column 4.

Leg attachment bracket 22, FIG. 7, is somewhat different, in that half of the body comprising the opening 44 is removable. This forms a half circle section 52. Half circle section 52 is tightened together with the body 54 by a pair of bolts or screws in threaded bores 48. The bolts or screws may also be counter sunk as shown. By tightening the half circle section 52 to the body 54, the leg attachment bracket 22 is tightened to column 4 in the proper position. This embodiment, as well as any other, may also include a groove 50 for the rack gear on column 4.

Figure 11:
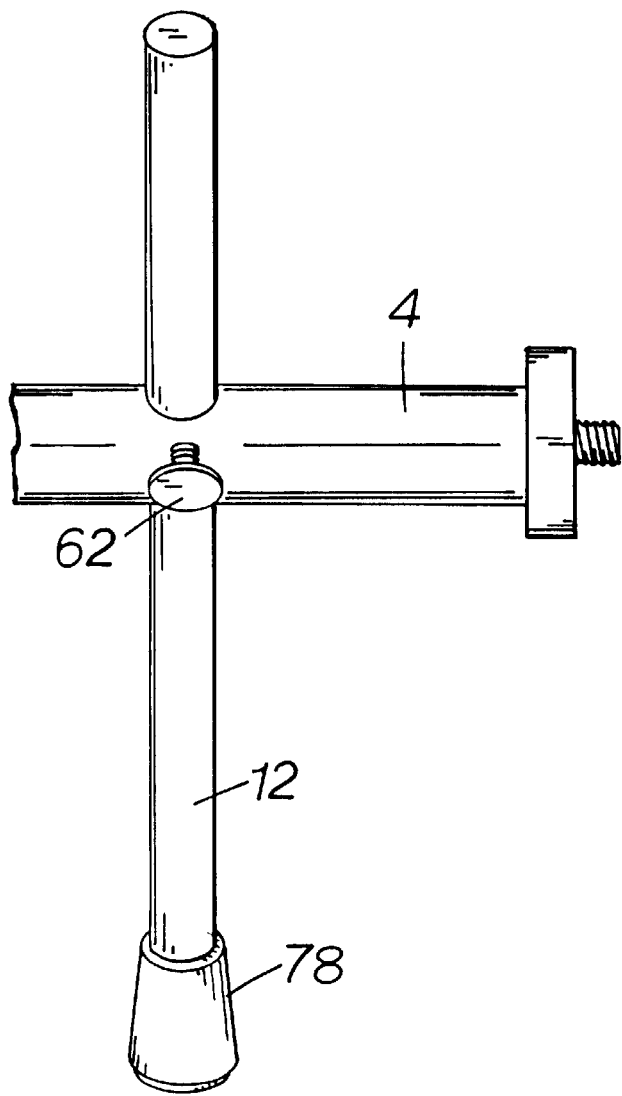
FIG. 11 is a perspective view of the additional leg installed using an insert as an attachment means.
Figure 10:
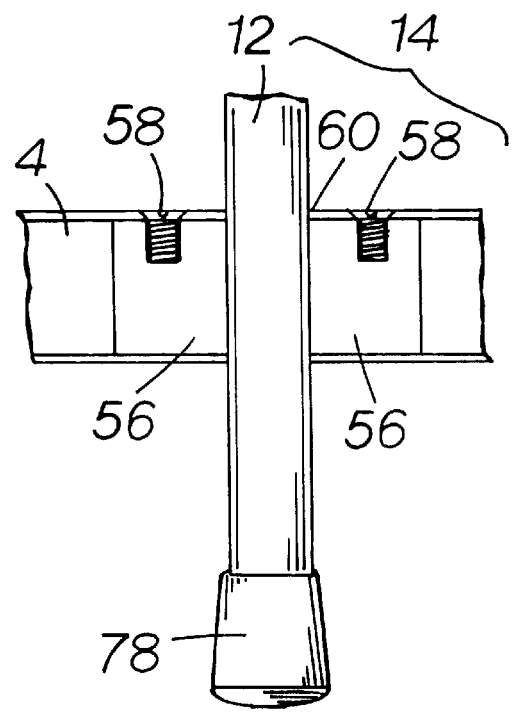
FIG. 10 is a sectional side view showing an insert installed within a column of a tripod.

The preferred embodiment for attachment means 14 is an insert 56 installed and secured within the column 4, FIGS. 10, 11 and 12. The insert 56 is a solid cylindrical plug sized to fit within column 4. In the preferred embodiment, a pair of countersunk screws 58 are screwed through the column 4 into the insert 56 to secure the insert in position. A lateral bore 60 extends through both the column 4 and insert 56. The lateral bore 60 receives the additional leg 12 and positions the additional leg 12 perpendicular to column 4. A locking bolt 62 is screwed through a threaded bore that extends through the column 4 and the insert 56 perpendicular to the lateral bore 60. The bolt 62 is tightened against the additional leg 12 installed within the lateral bore 60 to secure the leg in a given position. Since the additional leg 12 is removable, the screws 58 would be countersunk to prevent interference in the use of the tripod 1 when the column 4 is raised or lowered.

Figure 8:
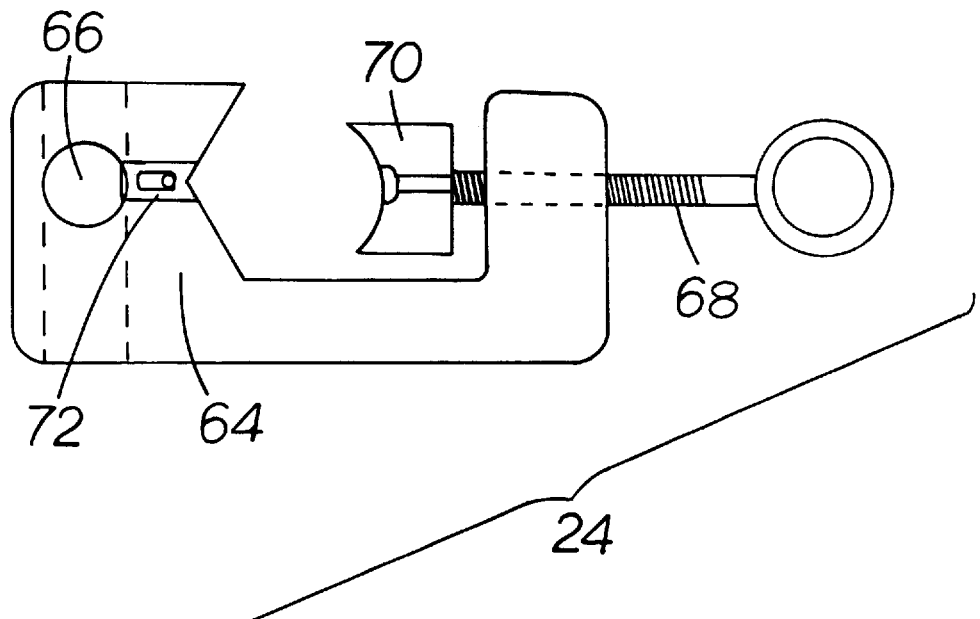
FIG. 8 is a side view of one embodiment of a tripod clamp.
Figure 9:
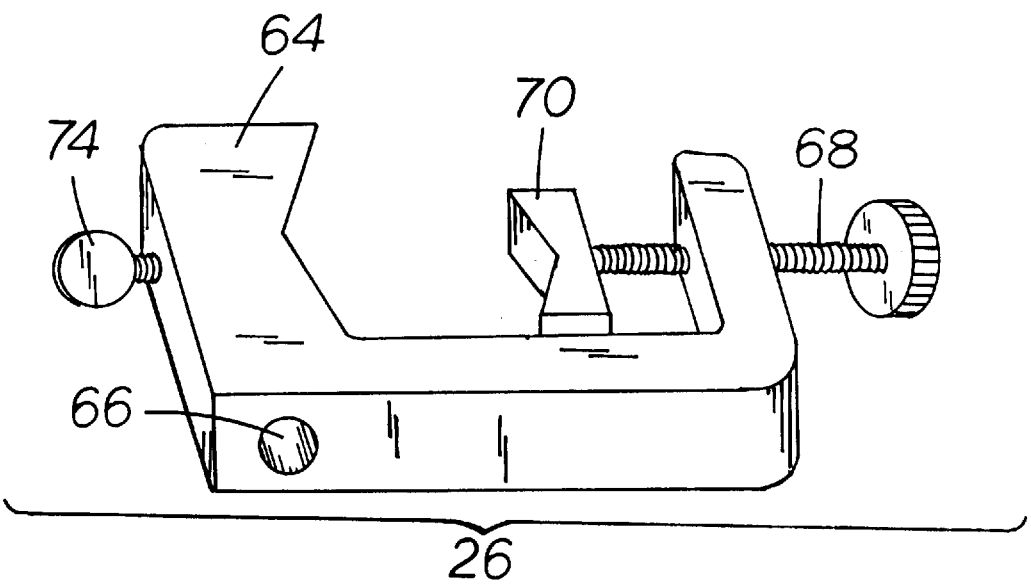
FIG. 9 is a side view of another embodiment of a tripod clamp.

Another type of attachment means is a tripod clamp 24 and 26, FIGS. 8 and 9. The tripod clamps 24 and 26 are similar to a C-Clamp design but with significant differences. The body 64 of tripod clamps 24 and 26 contains a lateral bore 66 therethrough. The lateral bore 66, as in other embodiments described above, is for receiving the additional leg 12. The tripod clamp 24, 26 attaches to the column 4 by tightening a threaded bolt 68 having a clamping member 70 against the column 4. The column 4 is squeezed between the body 64 of the clamp and the clamping member 70 to lock and secure the clamp 24, 26 in a given position on the column 4.

The difference between the two tripod clamps 24 and 26 is the means in which the additional leg 12 is secured within the lateral bore 66. Tripod clamp 24, FIG. 8, utilizes a locking member 72 installed between the lateral bore 66 and inside of the open portion the clamp body 64. As the column 4 is secured in tripod clamp 24, by tightening the threaded bolt 68, the column 4 contacts and pushes the locking member 72 against the additional leg 12. As the locking member 72 presses against the additional leg 12, it is locked and secure in a given position. By utilizing this embodiment, one action of tightening threaded bolt 68 locks both the tripod clamp 24 and the additional leg 12 in a given position. This save one step when attaching the additional leg 12.

Tripod clamp 26, FIG. 9, has an additional threaded bore perpendicular to the lateral bore 66. This threaded bore receives a bolt 74 that locks and holds the additional leg in a desired position perpendicular to the column.

During use of the low level tripod configuration, the additional leg 12 is used in conjunction with two of the legs 2 of the tripod 1. The low level tripod configuration 10 sets the tripod in a horizontal position supported by the additional leg 12 and the two legs 2. In order to establish a stable arrangement, the legs 2 should be spread and held in the spread position. This provides stability in the horizontal position. Some tripods 1 may not need any other means than what is provided on the tripod itself. Other tripods 1, however, will require additional support for the legs spread in this configuration.

Figure 13:
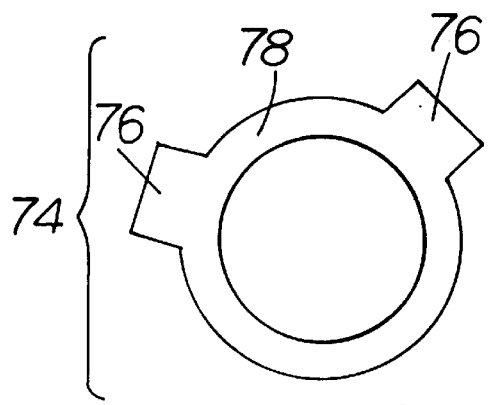
FIG. 13 is a top view of one embodiment of a leg spread bracket.
Figure 14:
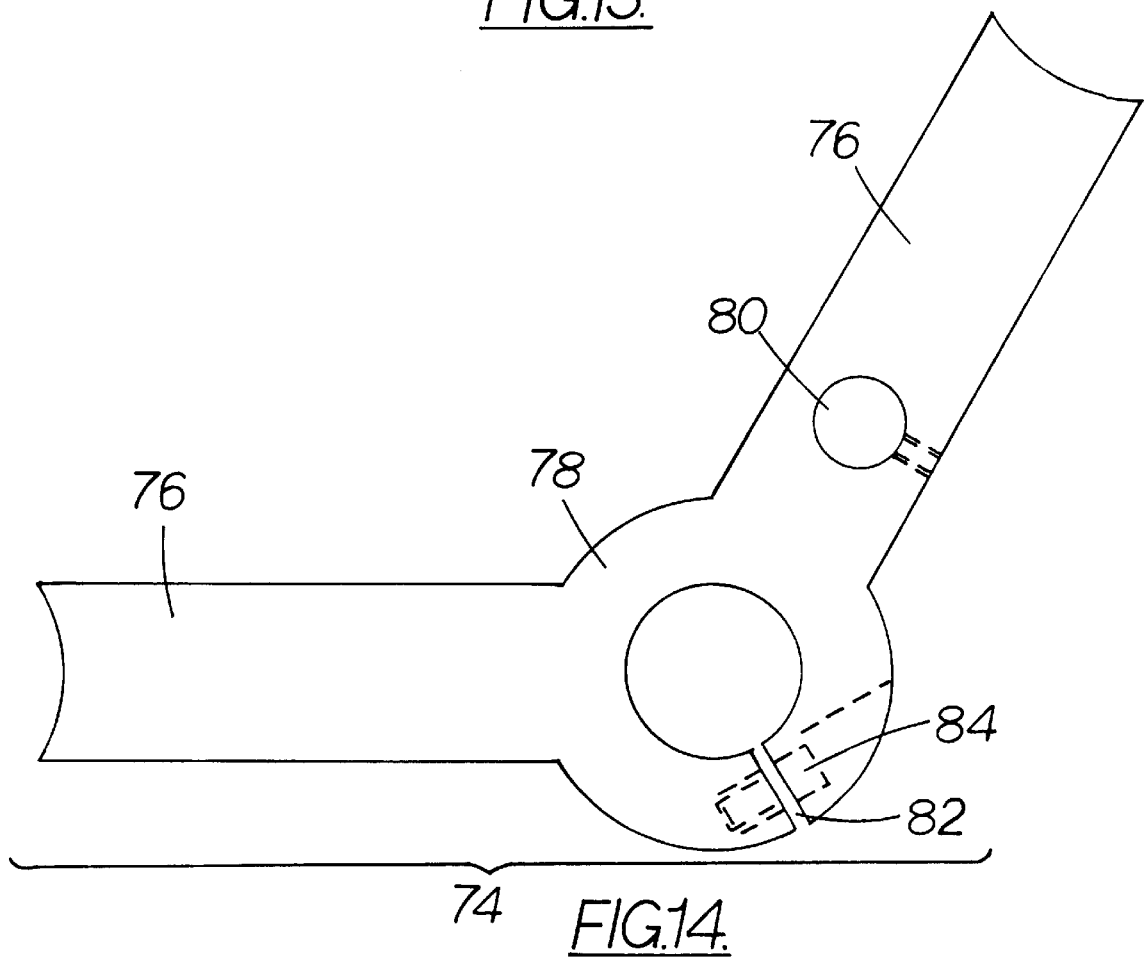
FIG. 14 is a top view of another embodiment of a leg spread bracket.

A leg spread bracket 74, FIGS. 13 and 14, is provided for holding the spread legs in a stable position for the tripods 1 requiring such additional support. Again, the configuration, model and design of the tripod will dictate the exact configuration of the leg spread bracket. Basically, the leg spread bracket 74 attaches to the tripod 1 between the plurality of legs 2. The leg spread bracket 74 will have a leg spread position and a leg closed position. In the leg spread position the two legs 2 used in supporting the tripod in the horizontal position are held by a generally secure means in the spread position. In the leg closed position, the legs 2 are allowed to fold inward without interference for transportation and storage.

In the preferred embodiment, the leg spread bracket 74 is rotatably attached to a lower end of the column 4 beneath the collar 3 and between the legs 2. The leg spread bracket 74 is rotated between the leg spread position and the leg closed position.

In a basic configuration, the leg spread bracket 74 will have two arms 76 extending from a central ring 78 at 120 degrees from each other. The central ring 78 in this embodiment is attached to the lower end of column 4. In this manner, the leg spread bracket 74 can be rotated between the legs as needed. In the leg closed position, the legs 2 would fold inward without interference from the leg spread bracket 74. In the leg spread position the legs 2 would rest upon the outer ends of arms 76. The arms 76 would provide the additional support needed for holding the legs 2 in a spread position when the tripod 1 is positioned in a horizontal position. The length of the arms 78 would depend on the model and style of the tripod 1.

FIGS. 13 and 14 illustrate two basic models of the leg spread bracket 74. Models that have longer arms 76 as illustrated in FIG. 14 may also include a bore 80 for storing the additional leg 12. A means of tightening the central ring 78 on the column 4 is also shown on FIG. 14. This is basically a slit 82 cut in the central ring 78 with a threaded bore 84 for receiving a screw or bolt for tightening the central ring 78 on the column 4. The central ring 78 may attach to the bottom end of the column 4 without any modification to the tripod in most instances.

In use, the attachment means 18, 20, 22, 24, 26 or 56 is installed on either the collar 3, the column 4 or on the head 5. The additional leg 12 is attached to the attachment means such that the additional leg 12 extends in a generally perpendicular relationship to the column 4 of the tripod 1. The tripod 1 can then be positioned in a generally horizontal position supported by a pair of the plurality of legs 2 on the tripod 1 and the additional leg 12. The optical device 6 on the head 5 is now placed in a low level and can be placed near a low lying object as desired.

Having described the invention in detail, those skilled in the art will appreciate that Configurations may be made of the invention without departing from the spirit of the inventive concept herein described.

Therefore, it is not intended that the scope of the invention be limited to the specific and preferred embodiments illustrated and described. Rather, it is intended that the scope of the invention be determined by the appended claims and their equivalents.

What is claimed is:

1. A low level tripod configuration having a tripod with a plurality of legs pivotally attached to a collar, a column adjustably supported by a center opening through said collar and a locking means to lock said column in a given position within said collar, and a head for holding an optical device on the top of said column, said configuration comprising;

an additional leg adjustably attached to an upper portion of said tripod, said additional leg extending outwardly in a generally perpendicular relationship to said column and being lockable in a desired position; and an attachment means on said upper portion of said tripod for attaching said additional leg, said additional leg and a pair of said plurality of legs of said tripod acting in conjunction to support said tripod in a generally horizontal position for positioning said optical device at a low level.

2. The low level tripod configuration as set forth in claim 1 in which said attachment means comprises a head block extension; said head block extension being attached between said top of said column and said head, said head block extension having a lateral bore therethrough for receiving said additional leg, and a locking threaded bolt extending through a threaded bore on said head block extension perpendicularly to said lateral bore to lock said additional leg in said head block extension.

3. The low level tripod configuration as set forth in claim 1 in which said attachment means comprises a leg attachment bracket, said bracket attached to said column and having a lateral bore therethrough to receive and hold said additional leg in a perpendicular relationship to said column, said leg attachment bracket having a locking device to secure and lock said additional leg in said bore.

4. The low level tripod configuration as set forth in claim 3 in which said locking device comprises a threaded bore extending through said leg attachment bracket perpendicular to said lateral bore and a locking bolt screwed through said threaded bore to secure and lock said additional leg in a perpendicular relationship to said column.

5. The low level tripod configuration as set forth in claim 1 in which said attachment means comprises an insert installed and secured within said column, a lateral bore through said column and said insert for receiving said additional leg, a threaded bore through said column and said insert perpendicular to said lateral bore for receiving a locking bolt that secures and holds said additional leg within said lateral bore, said leg being held in a perpendicular relation to said column.

6. The low level tripod configuration as set forth in claim 1 in which said attachment means comprises a tripod clamp, said tripod clamp being attachable to said column and having a lateral bore therethrough for receiving said additional leg and a means of locking and holding said additional leg in a desired position perpendicular to said column.

7. The low level tripod configuration as set forth in claim 6 in which said means of locking and holding said additional leg comprises a locking member, said locking member being a short rod installed in a bore perpendicular to said lateral bore in such a position that one end of said short rod engages said column as said tripod clamp is being installed on said column and an opposite end of said short rod engaging said additional leg to lock said additional leg in said tripod clamp and lock said tripod clamp to said column instanteously with each other.

8. The low level tripod configuration as set forth in claim 1 further comprising a leg spread bracket attached to said tripod between said plurality of legs; said leg spread bracket having a leg spread position and a leg closed position, said leg spread bracket in said leg spread position holding a pair of said plurality of legs in a spread position, such that said legs held in the spread position act in conjunction with said additional leg to support said tripod in a generally horizontal position for providing a low level position for said optical device, and said leg spread bracket in said leg closed position allowing said legs to fold inward without interference for transportation and storage.

9. The low level tripod configuration as set forth in claim 8 in which said leg spread bracket is rotatably attached to a lower end of said column beneath said collar and between said legs; said leg spread bracket being rotatable between said leg spread position and said leg closed position.

10. The low level tripod configuration as set forth in claim 8 in which said leg spread bracket further comprises an additional leg holding bore therethrough, said bore holding said additional leg when said additional leg is not being used.

11. The low level tripod configuration as set forth in claim 1 in which said additional leg comprises a short leg insertable within a lower end of one of said plurality of legs of said tripod and a locking cap/foot combination attached to one end of said short leg, said locking cap/foot combination securing and locking said short leg within said leg of said tripod and acting as a foot for both said additional leg and said leg of said tripod containing said short leg.

12. A low level tripod configuration having a tripod with a plurality of legs pivotally attached to a collar, a column adjustably supported by a center opening through said collar and a locking means to lock said column in a given position within said collar, and a head for holding an optical device on the top of said column, said configuration comprising;

an additional leg removably and adjustably attached to an upper portion of said tripod, said additional leg being a short leg extending outwardly in a generally perpendicular relationship to said column and being locked in a desired position;

an attachment means on said column for attaching said additional leg to said column, said additional leg and a pair of said plurality of legs acting in conjunction to support said tripod in a generally horizontal position for positioning said optical device at a low level; and a leg spread bracket rotatably attached to a lower end of said column beneath said collar and between said legs; said leg spread bracket being rotatable between said leg spread position and said leg closed position, said leg spread bracket in said leg spread position holding a pair of said plurality of legs of said tripod in a spread position, such that said legs held in the spread position act in conjunction with said additional leg to support said tripod in a generally horizontal position for providing a low level position for the optical device, and said leg spread bracket in said leg closed position allowing said legs to fold inward without interference for transportation and storage.

13. A method of providing a low level tripod configuration having a plurality of legs pivotally attached to a collar, a column adjustably supported by a center opening through said collar and a locking means to lock said column in a given position within said collar, and a head for holding an optical device on the top of said column, in which the steps comprise:

placing an attachment means on an upper portion of said tripod, said upper portion consisting of said collar, said column and said head;

attaching a short leg to said attachment means such that said short leg extends in a generally perpendicular relationship to said column of said tripod;

using a pair of said plurality of legs on said tripod in conjunction with said short leg to support said tripod in a generally horizontal position such that said optical device on said head can be placed near a low lying object.

* * * * *